US010435063B2

(12) United States Patent
Benak et al.

(10) Patent No.: US 10,435,063 B2
(45) Date of Patent: Oct. 8, 2019

(54) SYSTEM AND METHOD FOR DETERMINING VEHICLE STEERING MISALIGNMENT

(71) Applicant: Ford Global Technologies, LLC, Dearborn, MI (US)

(72) Inventors: Attila Benak, North-Rhine Westphalia (DE); Lodewijk Wijffels, Canton, MI (US); Sergio Codonesu, Aachen (DE); Oliver Nehls, Nordrhein-Westfalen (DE); Jeremy Alan Rawlings, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 15/809,394

(22) Filed: Nov. 10, 2017

(65) Prior Publication Data

US 2018/0134310 A1    May 17, 2018

(30) Foreign Application Priority Data

Nov. 11, 2016   (DE) .................. 10 2016 222 206

(51) Int. Cl.
 *B62D 6/08*    (2006.01)
 *B62D 5/04*    (2006.01)
 (Continued)

(52) U.S. Cl.
 CPC ........... *B62D 5/0481* (2013.01); *B62D 5/008* (2013.01); *B62D 6/00* (2013.01); *B62D 15/021* (2013.01);
 (Continued)

(58) Field of Classification Search
 CPC ........ B62D 5/008; B62D 5/0481; B62D 5/04; B62D 6/00; B62D 15/02; B62D 15/021
 (Continued)

(56) References Cited

U.S. PATENT DOCUMENTS 5,828,972 A * 10/1998 Asanuma ............... B62D 5/006
                                                            701/41
5,857,160 A    1/1999 Dickinson et al.
(Continued)

OTHER PUBLICATIONS

Steering Stability Control of a Four In-Wheel Motor Drive Electric Vehicle on a Road With Varying Adhesion Coefficient Rufei Hou ; Li Zhai ; Tianmin Sun ; Yuhan Hou ; Guixing Hu; IEEE Access; vol. 7 pp. 32617-32627; Year: 2019.*

(Continued)

*Primary Examiner* — Cuong H Nguyen
(74) *Attorney, Agent, or Firm* — Raymond L. Coppiellie; Burgess Law Office, PLLC

(57) ABSTRACT

A method for detecting steering misalignments in an adaptive steering system of a motor vehicle, wherein the adaptive steering system has a steering wheel angle sensor for detecting a value representative of a steering wheel angle, an adaptive angle unit for detecting a value representative of an adaptive angle, and a wheel angle detection unit for detecting a value representative of a wheel angle. The method including detecting a value representative of the steering wheel angle, detecting a value representative of the adaptive angle, detecting or determining a value representative of the wheel angle, and computing a comparison value.

11 Claims, 1 Drawing Sheet

(51) Int. Cl.
  *B62D 6/00* (2006.01)
  *B62D 15/02* (2006.01)
  *B62D 5/00* (2006.01)
  *B62D 6/10* (2006.01)
  *B62D 1/28* (2006.01)

(52) U.S. Cl.
  CPC .................. *B62D 1/28* (2013.01); *B62D 6/08* (2013.01); *B62D 6/10* (2013.01); *B62D 15/025* (2013.01)

(58) Field of Classification Search
  USPC .................................. 701/41–42; 324/207.25
  See application file for complete search history.

(56) References Cited

U.S. PATENT DOCUMENTS

| | | | | |
|---|---|---|---|---|
| 6,474,436 | B1* | 11/2002 | Konigorski | B62D 5/006 180/402 |
| 7,092,808 | B2 | 8/2006 | Lu et al. | |
| 8,571,758 | B2 | 10/2013 | Klier et al. | |
| 8,862,325 | B2 | 10/2014 | Soos | |
| 9,031,745 | B2* | 5/2015 | Bahena | B62D 6/10 701/41 |
| 2005/0209752 | A1* | 9/2005 | Ono | B62D 5/008 701/41 |
| 2006/0080016 | A1* | 4/2006 | Kasahara | B62D 5/006 701/41 |
| 2007/0233345 | A1 | 10/2007 | Endo et al. | |
| 2008/0040001 | A1* | 2/2008 | Ogawa | B62D 5/008 701/41 |
| 2011/0029200 | A1* | 2/2011 | Shah | B62D 5/008 701/41 |
| 2012/0130593 | A1* | 5/2012 | Davis | B62D 1/28 701/41 |
| 2014/0277944 | A1* | 9/2014 | Bean | B62D 6/008 701/41 |
| 2014/0288779 | A1* | 9/2014 | Di Cairano | B62D 15/0235 701/42 |
| 2015/0127221 | A1* | 5/2015 | Pugsley | B62D 5/049 701/41 |
| 2016/0152265 | A1 | 6/2016 | Codonesu et al. | |
| 2017/0233001 | A1* | 8/2017 | Moshchuk | B62D 1/28 701/42 |
| 2018/0111499 | A1* | 4/2018 | Wada | H01M 10/625 |

OTHER PUBLICATIONS

Human-Centered Feed-Forward Control of a Vehicle Steering System Based on a Driver's Path-Following Characteristics Wenshuo Wang ; Junqiang Xi ; Chang Liu ; Xiaohan Li; IEEE Transactions on Intelligent Transportation Systems; vol. 18 , Issue: 6; pp. 1440-1453; Year: 2017.*

Optimized Handling Stability Control Strategy for a Four In-Wheel Motor Independent-Drive Electric Vehicle Yong Chen ; Sizhong Chen ; Yuzhuang Zhao ; Zepeng Gao ; Changlong Li; IEEE Access; vol. 7 pp. 17017-17032; Year: 2019.*

Autonomous Vehicle Path Tracking Using Nonlinear Steering Control and Input-Output State Feedback Linearization. S. Bacha ; M. Y. Ayad ; R. Saadi ; O. Kraa ; A. Aboubou ; M.Y. Hammoudi; 2018 International Conference on Electrical Sciences and Technologies in Maghreb (CISTEM); Year: 2018; pp. 1-6.*

Ford Media Center, "Ford Adaptive Steering System Launching on 2016 Ford Edge Will Change How the World Turns," Sep. 15, 2015, article.

* cited by examiner

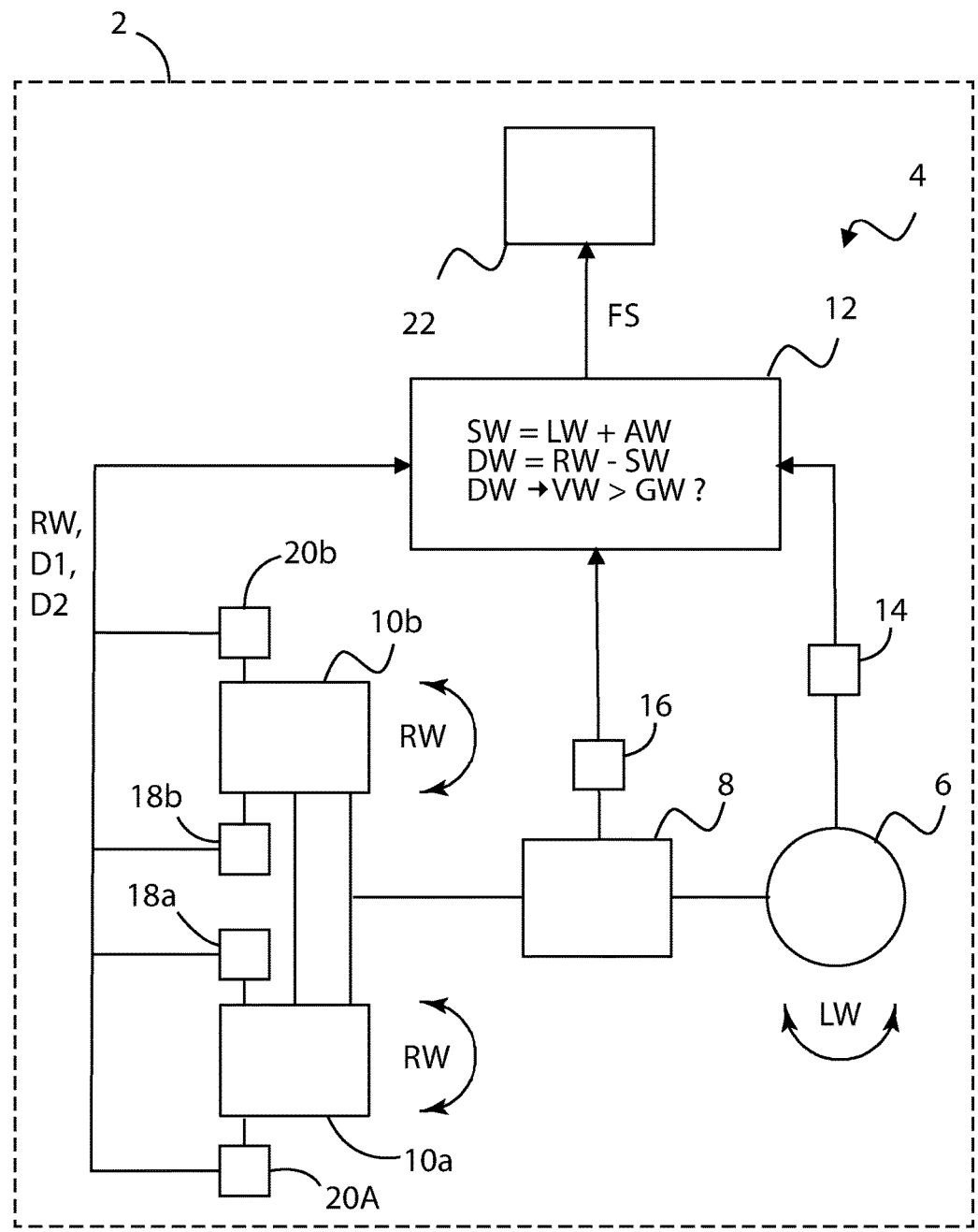

SYSTEM AND METHOD FOR DETERMINING VEHICLE STEERING MISALIGNMENT

CROSS-REFERENCE TO RELATED APPLICATIONS

Not Applicable.

BACKGROUND OF THE INVENTION

1. Field of the Invention

A method for detecting steering misalignments in a motor vehicle, in particular, steering misalignments caused by chassis wear.

2. Description of Related Art

Modern motor vehicles include a power steering system reducing the force required for turning a motor vehicle steering wheel when steering at a standstill, maneuvering, or at low travel speeds. The power steering system assists the driver during steering, by boosting the force applied by the driver with a hydraulic system. The hydraulic system typically including a hydraulic pump, controller, and motor or an electric motor.

An electrical auxiliary power steering system is an electrically driven power steering system that operates when steering movements take place. A substantial advantage of the electrical drive, in relation to a hydraulic assistance, is the steering system can be designed as adaptive and have assistance systems superimposed. The assisting torque, and therefore the force on the steering wheel, can be changed depending on the vehicle speed. Such systems solve the goal and conflict of a stronger steering aid when parking and a lesser steering aid during more rapid travel. The steering system can be an actuator capable of additional driver assistance tasks, including automatic steering interventions in the case of ESP, parking, and lane-keeping assistant functions. In addition, the steering assistance may only be active when required during steering procedures, resulting in a fuel savings over conventional hydraulic steering systems. In an AFS system (Active Front Steering), a steering angle applied to the steering wheel by the driver is superimposed, the system adds or subtracts an angle to/from the driver steering angle. The desired superimposed angle ascertained based on the driver steering angle, the steering speed, and the vehicle speed by a control unit is implemented by an electric motor as an additional angle. The AFS unit can be housed at various points in the system, for example, in the interior of the steering wheel, on the steering column, or on the pinion. The steering transmission ratio may be adapted optimally to the respective driving situation by the superimposed angle. For example, using a transmission ratio, the steering effort can be reduced at low speeds, for example, when parking. At moderate speeds, the steering and travel dynamics can be substantially increased by the selection of a more direct transmission ratio. At high speeds, a very calm and precise, but dynamic steering and/or driving behavior can be achieved by an indirect transmission ratio. Without an active steering system, these properties are generally in conflict.

However, wear and damage to components of the chassis can impair the driving experience, because wear and damage can cause a misalignment of the steerable wheels of the motor vehicle. Misalignment results in inconsistent vehicle behavior if the steerable wheel setting deviates from a nominal setting.

SUMMARY OF THE INVENTION

A vehicle including a controller, connected to and receiving output from a steering wheel angle sensor; an adaptive angle detection unit; and a wheel angle detection unit to determine a comparison value based on the output and generate an error signal when the comparison value is greater than a limiting value.

In an additional embodiment the vehicle includes first and second pressure sensors wherein the error signal is suppressed based on a difference in an output of the first and second pressure sensors.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic illustration of an adaptive steering system for a motor vehicle according to an exemplary embodiment of the present invention.

DETAILED DESCRIPTION OF THE PREFERRED EMBODIMENTS

This description of the preferred embodiment is merely exemplary in nature and is in no way intended to limit the invention, its application, or uses.

FIG. 1 shows an adaptive steering system 4 of a motor vehicle 2, for example, a passenger automobile. The motor vehicle 2 having wheels 10a, 10b, in the present exemplary embodiment a steerable right and left front wheel, to which a steering setting can be applied.

In the present exemplary embodiment, the adaptive steering system 4 has an electric motor 8, for example, a program-controlled electric servo motor, that assists and superimposes the steering movement of the driver caused by rotating the steering wheel 6.

In an exemplary embodiment, the electric motor 8 is shown separate from the steering wheel 6. Notwithstanding the exemplary embodiment, the electric motor 8 can also be arranged at other locations, for example, in interior of the steering wheel 6.

In operation, the electric motor 8 converts the commands originating from a control unit (not shown) into mechanical movement (steering transmission ratio). At lower or low speeds, for example when parking, the adaptive steering system 4 changes the steering transmission ratio and the steering wheel 6 is turned less by the driver to achieve the same degree of steerable wheel movement. At higher speeds, for example, on the freeway, the adaptive steering system 4 selects a more indirect steering transmission ratio. For the driver, this means a precise directional stability of the motor vehicle 2.

However, wear and damage to components of the chassis can cause a misalignment of steerable wheels 10a, 10b of the motor vehicle 2 causing inconsistent vehicle behavior if the steerable wheels 10a, 10b setting deviates from a nominal setting.

A device or controller 12 operates to determine steering misalignments in the adaptive steering system 4. The device 12 may include hardware and/or software components for functions described hereafter.

The device 12 connects to a steering wheel angle sensor 14 to input a value for a steering wheel angle LW of the steering wheel 6. The device 12 connects to an adaptive angle unit 16 that detects an adaptive angle AW, which the electric motor 8 adds to the steering setting of the steering wheel 6. The device 12 connects to a wheel angle detection unit 18a, 18b, to input a wheel angle RW that the steerable wheels 10a, 10b deviate from a setting for straight ahead travel. The wheel angle RW is the actual steering setting of the wheels 10a, 10b. In the exemplary embodiment, the wheel angle detection unit 18a, 18b includes a motor angle sensor of an EPAS servo motor or a steering angle sensor of an AFS system for determining the wheel angle RW. The wheel angle RW ascertained from the motor angle of the EPAS servo motor or the steering angle of the AFS system, respectively. Determining the wheel angle RW includes information relating to the steering and chassis geometry and includes various signals describing or identifying the driving dynamics, for example, the yaw rate, lateral acceleration, and wheel speeds. The wheel angle RW may also be determined using a wheel angle sensor.

In operation, the device 12 periodically receives the value for the steering wheel angle LW, the value for the adaptive angle AW, and the value for the wheel angle RW and computes a comparison value VW. In the exemplary embodiment a total value SW is computed from the value for the steering wheel angle LW and the adaptive angle AW. A difference value DW is computed from the total value SW and the value for the wheel angle RW. An error signal FS is generated if a comparison of the comparison value VW to a limiting value GW results in the comparison value VW being greater than the limiting value GW.

The presence of the error signal FS, increases an error counter 22, for example, by one. The number of times the detected error signals FS exceeds a predetermined limit, can be archived as an error in a control unit (not shown) of the motor vehicle 2, which is routinely read during motor vehicle inspections. Alternatively, a warning signal can be generated upon a detection of one or more error signals FS to acoustically and/or visually inform the driver of the motor vehicle 2. As an alternative to the error counter 22, a single flag or status indicator can be set if the error signal exceeds the limiting value for a predefined duration. This flag would then trigger the error entry in the error memory and/or the warning message to the driver.

In the exemplary embodiment, the device 12 is connected to pressure sensors 20a, 20b of the two steerable wheels 10a, 10b that detect the respective pressure D1, D2 of the steerable wheels 10a, 10b. The device 12 compares the pressures D1, D2 of the right and left wheel 10a, 10b and if a difference exists compares the difference to a pressure limiting value. If the comparison results in a difference greater than the pressure limiting value, the undesired driving behavior may be attributed to the pressure difference of the two steerable wheels 10a, 10b. Wherein, the adaptive steering system is intact and generation of the error signal FS is suppressed.

The error signal FS provides information whereby aging of or damage to components of the adaptive steering system 4 can be detected early, whereupon a replacement of aged or defective components can be performed.

The exemplary embodiment provides a method for operating an adaptive steering system of a motor vehicle. The adaptive steering system has a steering wheel angle sensor 14 for detecting a value representative of a steering wheel angle LW, an adaptive angle unit 16 for detecting a value representative of an adaptive angle AW, and a wheel angle detection unit 18a, 18b for detecting a value representative of a wheel angle RW. In the exemplary embodiment, the method detects a value representative of the steering wheel angle LW, a value representative of the adaptive angle AW, and detects or determines a value representative of the wheel angle RW. Based on these values the method computes a comparison value VW, with analysis of the value representative of the steering wheel angle LW and the value representative of the adaptive angle AW and the value representative of the wheel angle RW. The method generates an error signal if a comparison of the comparison value VW to a limiting value GW indicates that the comparison value VW is greater than the limiting value GW.

The error signal provides information useful for early detection of aging or damage to components of the adaptive steering system, whereupon a replacement of aged or defective components can be performed.

In one embodiment, the comparison value is determined by computing a total value SW from the value representative of the steering wheel angle LW and the value representative of the adaptive angle AW wherein a difference value DW equals the difference between the value representative of the wheel angle RW and the total value SW.

The respective values for the respective angles are periodically inputted and then, the total of the two values LW, AW is calculated similarly to the interaction of the steering wheel and the assisting actuator of the adaptive steering system. In a second step, the difference of the total SW and the value for the wheel angle is then determined RW, which is zero or at least nearly zero with a functioning adaptive steering system.

A steering wheel angle value LW is used as a value representative of the steering wheel angle, an adaptive angle value is used as a value representative of the adaptive angle AW, and a wheel angle value is used as a value representative of the wheel angle RW. The respective present values are used that correspond to the respective steering setting making possible a simple determination of the error signal.

As disclosed, an error counter is increased upon a presence of the error signal. When the number of the detected error signals exceeds a predetermined limit, it can be archived as an error in a control unit of the motor vehicle read out during motor vehicle inspections. Alternatively, a warning signal can be generated upon a detection of one or more error signals, to acoustically and/or visually inform the driver of the motor vehicle. The foregoing method simplifies detecting wear and damage to components of the steering system early and counteracting them by replacing aged or defective components.

In another embodiment, wheel pressure values of the motor vehicle are detected and analyzed, and the generation of the error signal is suppressed upon a deviation. The analysis of the pressure values may include, for example, the pressure values of the right and left front wheels being compared to one another. If the comparison results in a difference greater than a threshold, the undesired driving behavior may be attributed to the pressure difference of the two steerable wheels whereby the adaptive steering system is still intact.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for determining a steering misalignment of an adaptive steering system of a motor vehicle having a steering wheel angle sensor for detecting a value representative of a steering wheel angle, an adaptive angle unit for detecting a value representative of an adaptive angle, and a wheel angle detection unit for detecting a value representative of a wheel angle comprising:
    obtaining a value representative of the steering wheel angle;
    obtaining a value representative of the adaptive angle;
    obtaining a value representative of the wheel angle;
    determining a comparison value based on the steering wheel angle value, the adaptive angle value, and the wheel angle value; and
    generating an error signal when the comparison value is greater than a limiting value.

2. The method of claim 1 wherein the steps to compute the comparison value include:
    determining a total value from the steering wheel angle value and the adaptive angle value; and
    computing a difference value from the total value and the wheel angle value and using the difference value in determining the comparison value.

3. The method of claim 1 wherein the steering wheel angle value represents a steering wheel angle and an adaptive angle value represents the adaptive angle and a wheel angle represents the wheel angle.

4. The method of claim 1 including an error counter, the error counter incrementally increased based on each occurrence of an error signal.

5. The method of claim 4 including obtaining a pressure values for each wheel of the motor vehicle and suppressing generation of the error signal upon a deviation in the pressure values.

6. A device for detecting steering misalignments comprising:
    a steering wheel angle sensor;
    an adaptive angle detection unit;
    a wheel angle detection unit;
    a controller, connected to and receiving output from said steering wheel angle sensor; adaptive angle detection unit; and wheel angle detection unit to determine a comparison value based on said output and generate an error signal when the comparison value is greater than a limiting value.

7. The device of claim 6 including the device computes a total value from a steering wheel angle and adaptive angle; and
    computes a difference value based on the total value and the wheel angle to determine the comparison value.

8. The device of claim 6 including an error counter, the error counter incrementally increased based on each error signal.

9. The device of claim 6 including first and second pressure sensors associated with first and second wheels said generation of the error signal suppressed based on a deviation between an output of said first and second pressure sensors.

10. A vehicle comprising:
    a controller, connected to and receiving output from a steering wheel angle sensor; an adaptive angle detection unit; and a wheel angle detection unit to determine a comparison value based on said output and generate an error signal when the comparison value is greater than a limiting value;
    first and second pressure sensors, said error signal suppressed based on a difference in an output of said first and second pressure sensors.

11. The vehicle of claim 10 including an error counter, the error counter incrementally increased based on each error signal.

* * * * *